United States Patent Office 3,325,450
Patented June 13, 1967

3,325,450
POLYSILOXANEIMIDES AND THEIR PRODUCTION
Fred F. Holub, Scotia, N.Y., assignor to General Electric Company, a corporation of New York
No Drawing. Filed May 12, 1965, Ser. No. 455,311
8 Claims. (Cl. 260—46.5)

This invention is concerned with new compositions of of matter. More particularly, the invention relates to polysiloxaneimides corresponding to the formula

I

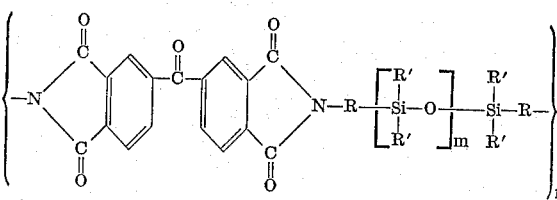

where R is a divalent hydrocarbon radical, R' is a monovalent hydrocarbon radical, $m$ is a whole number equal to at least one, for example, 1 to 1000 or more, and $n$ is a whole number in excess of 10, for example, from 10 to 10,000 or more. These compositions can be obtained by effecting reaction between benzophenonetetracarboxylic dianhydride (hereinafter referred to as "benzophenone dianhydride") having the formula

II

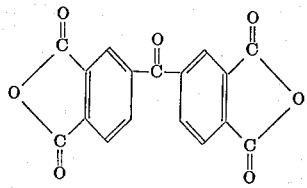

with a terminally substituted diaminopolysiloxane (hereinafter referred to as "the diamino compound") of the formula

III

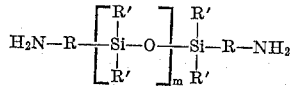

where R, R' and $m$ have the meanings given above.

The initial reaction between the benzophenone dianhydride and the diamino compound of Formula III takes place at lower temperatures to yield an intermediate isomer product having the formula

IV

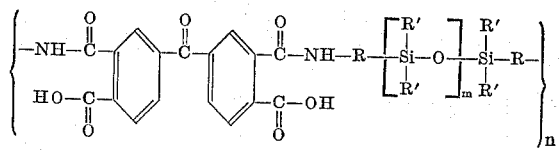

where R, R', $m$ and $n$ have the meanings given above. Upon further heating at temperatures of about 150 to 350° C. or higher, the polymeric amido compound of Formula IV cyclizes to yield the imidized derivative composed of recurring units of the structural Formula I.

Among the divalent radicals which R may be are, for instance, methylene, ethylene, trimethylene, isopropylidene [—CH(CH₃)CH₂—], isobutylene, tetramethylene, pentamethylene, phenylene, tolylene, xylylene, biphenylene

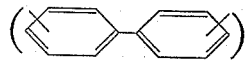

diphenylene oxide

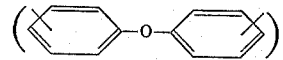

diphenylene sulfone, etc., with valences of the arylene radicals being ortho, meta, or para to each other or to connecting bonds between adjacent arylene radicals.

Among the monovalent hydrocarbon radicals which R' may be are, for instance, alkyl radicals (e.g., methyl, ethyl, propyl, butyl, isobutyl, decyl, etc.); aryl radicals (e.g., phenyl, naphthyl, biphenyl, etc.); alkaryl radicals (e.g., tolyl, xylyl, ethylphenyl, etc.); aralkyl radicals (e.g., benzyl, phenylethyl, etc.); alkenyl radicals (e.g., vinyl, allyl, methallyl, etc.), etc.

The reaction between the diamino compound and the benzophenone dianhydride is advantageously carried out in a suitable solvent. Among such solvents may be mentioned, e.g., dimethyl formamide, N-methyl-2-pyrrolidone, cresol, etc. In general one employs approximately from 0.9 to 1.1 mols of the diamino compound per mol of the benzophenone dianhydride and advantageously equimolar concentrations are used. The initial reaction can be carried out from room temperature to 150° C. to obtain the amido acid derivative of Formula IV. Thereafter, the solvent is advantageously removed and the resulting polymer heated at temperatures of from about 150° to 400° C. to effect cyclization and formation of the imide structure as shown in Formula I.

The compositions of the present invention have many uses. Because of their high temperature resistance, they are exceptionally suitable as insulation for electrical conductors. Solutions of the initial polymer composed of recurring units of the structural Formula IV can be applied as coatings to electrical conductors such as copper, aluminum, alloys of copper, etc., and thereafter the coated conductors heated at the elevated temperatures required to effect removal of the solvent and to cause imidization of the polymer. Films can be cast from solutions of the preliminary compositions of Formula IV, and the solvent then can be evaporated and cyclization to form the polymer of Formula I attained by heating the film at the elevated temperatures required for the purpose. Films thus obtained composed of recurring units of structural Formula I can be used in packaging applications where resistance to high temperatures is desired. These films of Formula I can be used as slot liners in motors to take advantage of the heat stability and solvent resistance of the polymers. The latter films can also be employed to wrap electrical conductors and to protect the conductors from deterioration to the elements including heat and corrosive and abrasive actions of an environment.

In order that those skilled in the art can better understand how the present invention may be practiced, the following examples are given by way of illustration and not by way of limitation. Unless otherwise stated, all parts are by weight.

The aminobutyl tetramethyldisiloxane employed in Example 1 below was prepared by first reacting allyl cyanide with dimethylchlorosilane in accordance with the method described in the copending application of Maurice Prober, Ser. No. 401,704, filed Dec. 31, 1953, now U.S. Patent 3,185,719, and assigned to the same assignee as the present invention. By hydrolysis of the formed cyanopropyldimethylchlorosilane, advantageously in a mixture of sodium bicarbonate and an amount of water in excess of that required for complete hydrolysis of the silicon-bonded chlorine, one obtains the 1,3 - bis-gamma-cyanopropyltetramethyldisiloxane which can then be reduced with hydrogen in the presence of Raney nickel to yield 1,3-bis-delta-aminobutyltetramethyldisiloxane.

The 1,3-bis-gamma-aminopropyltetramethyldisiloxane of Example 2 is prepared similarly as the aminobutyltetramethyldisiloxane of Example 1, with the exception that instead of using allyl cyanide, one employs acrylonitrile.

The aminopropylpolydimethylsiloxane of Example 3 is obtained by first making the chlorine-terminated polydimethylsiloxane of the formula

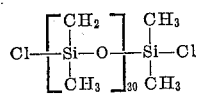

in accordance with the procedure described in Patnode Patent 2,381,366, issued Aug. 7, 1945. By reaction of the halogen terminated polysiloxane with lithium hydride one obtains the corresponding hydrogen-terminated polydimethylsiloxane which can then be reacted with acrylonitrile to give the bis-cyanoethyl polydimethylsiloxane. This latter compound can in turn be reduced with hydrogen in the manner described above to yield the desired bis-aminopropyl-terminated polydimethylsiloxane employed in Example 3.

It should also be recognized if one desires to employ, for instance, 1,3-bis-(aminomethyl)tetramethyldisiloxane for reaction with the benzophenone dianhydride, one can react, for instance, 1,3-bis(chloromethyl)tetramethyldisiloxane with ammonia to give the 1,3-bis-(aminomethyl)tetramethyl disiloxane.

*Example 1*

A mixture of 2.76 grams of 1,3 - bis - delta - aminobutyltetramethyldisiloxane, 20.0 grams N - methyl - 2 - pyrrolidone, and 3.22 grams benzophenone dianhydride was reacted at room temperature (about 25–30° C.) until a homogeneous solution was obtained indicating interaction between the reactants to form the amide acid derivative generically disclosed in Formula IV above. A portion of this solution was placed on a glass surface and heated at a temperature of 150–250° C. for one hour to remove the solvent and to yield a polymeric film whose structure was composed of recurring units of the formula

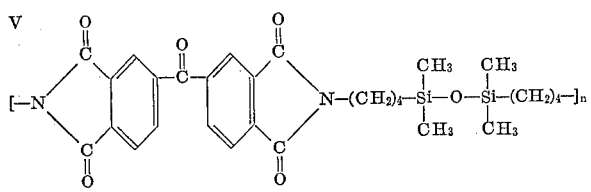

where $n$ is a whole number in excess of 10. A nickel-plated copper wire was also dipped in the solution of the polyamide resin solution (before cyclization) and this coated conductor was then heated for 3 minutes at 300° C. This coating and heat-treatment of the conductor was repeated three times. The final polyimide film of Formula V obtained on the conductor had good resistance to abrasion, was flexible, and could be bent around its own diameter even after aging for 16 hours at 250° C. A sample of the polymer of Formula V lost only 6.2% of its weight after 16 hours at 250° C.

*Example 2*

Employing the conditions of Example 1, about 6.4 grams of the benzophenone dianhydride dissolved in about 50 cc. dimethyl formamide is reacted at a temperature of about 30 to 50° C. with stirring with 4.9 grams of 1,3 - bis-gamma-aminopropyltetramethyldisiloxane. The mixture is then heated to a temperature of about 150° C. to remove the solvent and then the temperature is raised to about 200–250° C., and the polymer heated for about one hour to yield a polyimide resin composed of recurring structural units of the formula

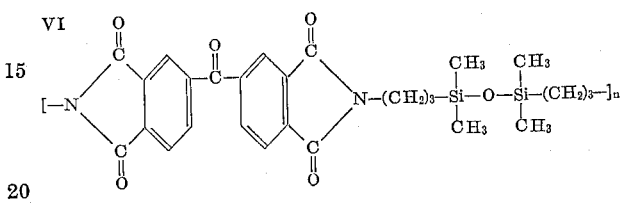

where $n$ is a whole number in excess of 10.

*Example 3*

Employing the conditions of Example 1, 6.4 grams benzophenone dianhydride in about 300 cc. dimethyl formamide in an inert atmosphere is reacted with 48 grams of a liquid polydimethylsiloxane having a molecular weight of about 2400 and comprising a polymer of dimethylsiloxane having the formula

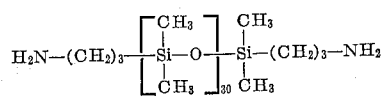

at about 50° C. to obtain a polyamide. After removal of the solvent by distillation at a temperature of about 150° C. and heating the reaction mixture at temperatures of 220–230° C. for about one hour, a polymer is obtained composed of recurring units of the formula

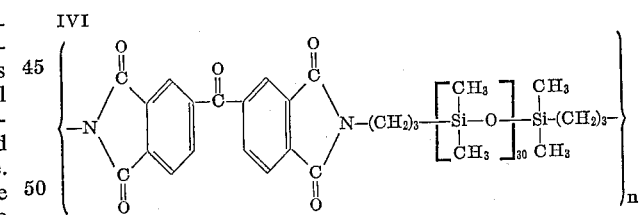

where $n$ has a value in excess of 10.

It will be apparent to those skilled in the art that other diamino compounds free of silicon can be employed in conjunction with the reaction between the benzophenone dianhydride and the diamino compounds described above. Among such other diamino compounds which may be used in amounts up to 75 mol percent of the diamino compound are, for instance, m-phenylene diamine, p-phenylene diamine, methylene dianiline, 4,4'-diaminodiphenyl oxide, 4,4'-diaminodiphenyl sulfone, hexamethylene diamine, etc. The following example illustrates the formation of such coreaction products.

*Example 4*

In this example, a mixture of 9.66 grams benzophenone dianhydride, 2.16 grams m-phenylene diamine, 2.78 grams 1,3-bis-delta-aminobutyltetramethyldisiloxane, and 45.0 grams N,N'-dimethylacetamide was stirred over a period of about ½ hour within a temperature range of 25–50° C. to give a viscous polymer solution. A sample of this viscous solution when cast on a glass plate and heated slowly at 250° C. to remove the solvent, yielded a flexible, strong polymeric film composed of recurring structural units of the formula

VIII

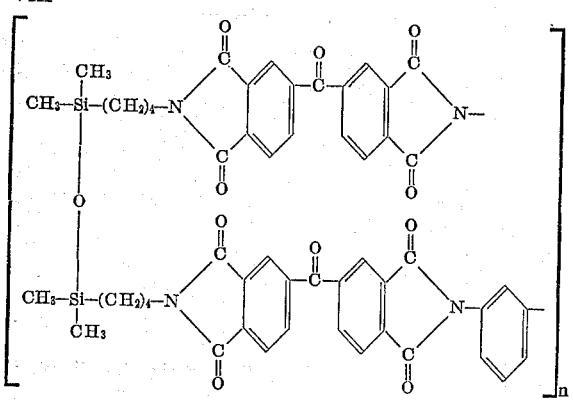

where $n$ is a whole number in excess of 10.

In place of the aminopolysiloxanes employed in the foregoing examples, other aminopolysiloxanes may be employed as, for instance,

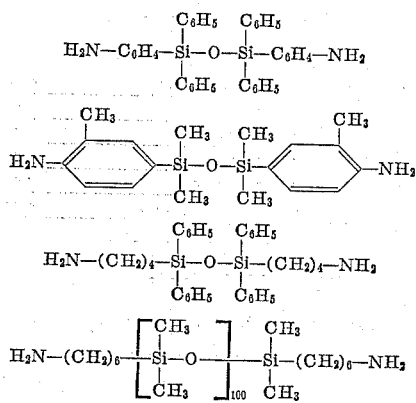

etc.

Many other organopolysiloxanes containing at least two amino groups attached to silicon by the medium of a carbon atom may also be used for reaction with the benzophenone dianhydride. Among these may be mentioned organopolysiloxanes corresponding to the formula $$R''_a SiO_{4-a/2}$$

in which R" is an organic radical, for instance, ethyl, propyl, butyl, hexyl, isobutyl, vinyl, phenyl, etc., wherein at least two of the R" groups are substituted with an —NH$_2$ group and $a$ has a value from 1 to 3, inclusive. These amino polysiloxanes can be prepared by reducing with hydrogen the corresponding cyano-organopolysiloxane employing as the cyano-organopolysiloxane for the purpose those compounds and methods for preparing those compounds disclosed and claimed in the copending application of Maurice Prober, Ser. No. 401,701, filed Dec. 31, 1953, now U.S. Patent 3,185,663, and assigned to the same assignee as the present invention. The monomeric organosilicon compositions containing nitrile radicals used to make cyano-organopolysiloxanes can be prepared in accordance with the description found in the copending application of Maurice Prober, Ser. No. 401,704, filed Dec. 31, 1953, now U.S. Patent 3,185,719, and assigned to the same assignee as the present invention. Additional directions for making the cyano-alkyl polysiloxanes which can be converted to amino alkyl polysiloxanes can be found in British Patent 786,020, published Nov. 6, 1957. When other organic diamine compounds free of silicon, many examples of which are given above, are used, these are also capable of forming imide groups with the benzophenone dianhydride. Other diamino compounds which may be employed in the practice of this invention will be clearly apparent from the descriptions above, particularly when reference is made to the diamines generically recited in Formula III. It is also intended other conditions and reactants, many of which are described above, may be employed without departing from the scope of the invention.

Other polysiloxanes and amides can be prepared by effecting reaction between the benzophenone dianhydride and monomeric aminosilanes employing a mol ratio 1 mol of the dianhydride to 2 or more mols of the aminosilane to yield high molecular weight compounds. By hydrolyzing the organoxy groups and heating the polymer, the latter can be converted to a polyimide composition. Among the aminosilanes which can be employed for this purpose are those having the formulas

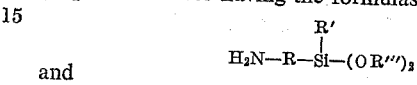

and $H_2N-R-Si-(OR''')_3$ where R and R' have the meaning given above and R''' has the same meanings as R'. As examples of polymers which can be obtained by reacting the aminosilane with the benzophenone dianhydride, the following examples illustrate procedures which have been employed for the purpose.

Example 5

About 20.5 grams of delta-aminobutylmethyldiethoxysilane, 80 grams N-methylpyrrolidone, and 16.1 grams benzophenone dianhydride were stirred for 10 minutes at room temperature during which time the reaction became exothermic. The clear viscous solution which was obtained was then spread on a glass surface and heated for ½ hour at 150° C. to give a flexible film. When a similar film was heated for 10 minutes at about 100 to 340° C., a film was obtained which resisted abrasion and did not soften even at 340° C.

Example 6

In this example, 22.1 grams of gamma-amino-propyl-triethyoxysilane, 80 grams N-methylpyrrolidone and 16.1 grams benzophenone dianhydride were mixed together at room temperature for about 10 to 15 minutes at which time an exothermic reaction occurred. The clear viscous solution which resulted was then placed on a glass surface and heated for 1½ hours at 250° C. to effect cyclization and formation of a polyimide polymer. This polymer was a hard film and could be heated at temperatures from 150–200° C. for long periods of time without apparent change in the physical properties of the film.

What I claim as new and desire to secure by Letters Patent of the United States is:

1. A composition of the matter composed of recurring units of the formula

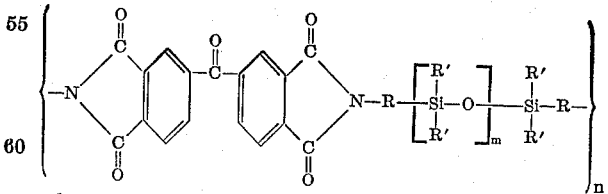

where R is a divalent hydrocarbon radical, R' is a monovalent hydrocarbon radical, $m$ is a whole number equal to at least 1 and $n$ is a whole number of from 10 to 10,000.

2. A polymeric composition composed of recurring units of the formula

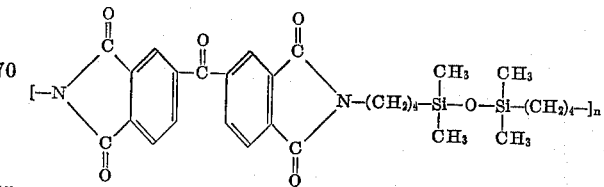

where $n$ is a whole number from 10 to 10,000.

3. A polymeric composition composed of recurring units of the formula

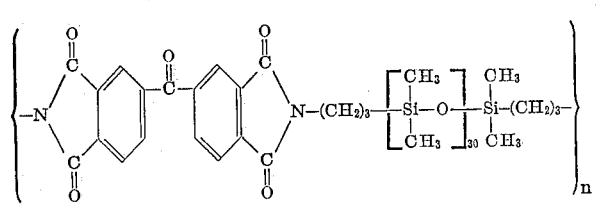

where $n$ is a whole number of from 10 to 10,000.

4. A composition of the matter composed of recurring units of the formula

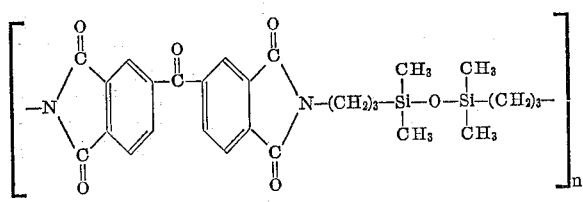

where $n$ is a whole number of from 10 to 10,000.

5. The process for making polymeric compositions composed of recurring structural units of the formula

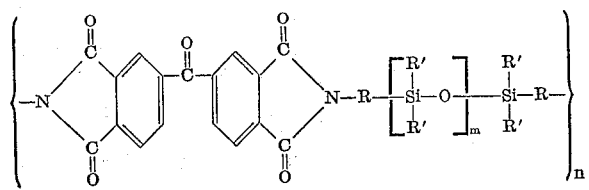

which comprises effecting reaction between a diamino compound of formula

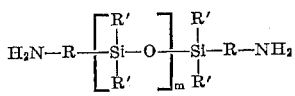

and benzophenonetetracarboxylic dianhydride, and heating the reaction product at a temperature of from about 150° C. to about 400° C. to effect cyclization and formation of the above-identified polymeric composition, where R is a divalent hydrocarbon radical, R' is a monovalent hydrocarbon radical, $m$ is a whole number equal to at least 1, and $n$ is a whole number of from 10 to 10,000.

6. The process as in claim 5 wherein the diamino compound is 1,3-bis-delta-aminobutyltetramethyldisiloxane.

7. The process as in claim 5 wherein the diamino compound is 1,3 - bis - gamma - aminopropyltetramethyldisiloxane.

8. The process as in claim 5 wherein the diamino compound corresponds to the formula

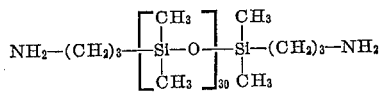

References Cited

UNITED STATES PATENTS

| | | | |
|---|---|---|---|
| 2,998,406 | 8/1961 | Bailey et al. | 260—46.5 |
| 3,179,614 | 4/1965 | Edwards | 260—46.5 |
| 3,179,630 | 4/1965 | Endrey | 260—46.5 |
| 3,179,631 | 4/1965 | Endrey | 260—46.5 |
| 3,179,634 | 4/1965 | Edwards | 260—46.5 |
| 3,274,155 | 9/1966 | Saunders et al. | 260—46.5 |

FOREIGN PATENTS 6,414,419  6/1965  Netherlands.

DONALD E. CZAJA, *Primary Examiner.*

LEON J. BERCOVITZ, M. I. MARQUIS,
*Assistant Examiners.*